May 16, 1961  U. G. HANSELL  2,983,988
METHOD OF POLARIZING TRANSDUCERS
Filed June 16, 1953

INVENTOR.
ULF G. HANSELL
BY
*George H. Fisher*
ATTORNEY

United States Patent Office 2,983,988
Patented May 16, 1961

2,983,988
METHOD OF POLARIZING TRANSDUCERS

Ulf G. Hansell, Stonington, Conn., assignor to Minneapolis-Honeywell Regulator Company, Minneapolis, Minn., a corporation of Delaware Filed June 16, 1953, Ser. No. 362,001

3 Claims. (Cl. 29—25.35)

The present invention relates to an improved method for polarizing or activating transducers comprising polycrystalline material having a high dielectric constant such as a transducer which contains a substantial portion of barium titanate, and may also contain other titanates, for example lead titanate, calcium titanate and the like.

Heretofore, methods of polarizing such substances have been proposed, however these methods require relatively high polarizing potentials over relatively long periods of time and may also require a mechanical stress in addition to the polarizing potential. These methods have been successful to a certain extent, but by my process, I have been able to permanently polarize a transducer of the type set forth above in a manner such that they will become polarized or activated in a much shorter period of time than previously possible, and will become polarized during that period under the application of a much lower potential. Results obtained by the present process are found superior to those obtained by methods heretofore utilized as exhibited by the superior mechanical response or strain to a given electrical excitation field as well as the greater electrical response obtained from a given mechanical activation or applied strain.

According to the present invention, a potential is applied to electrodes situated in spaced relationship on a transducer body, preferably on opposite parallel faces thereof, while the body is cooling through its Curie point of transition temperature, this potential including a basic uni-directional potential component upon which there is superimposed an alternating ripple component of substantially constant frequency. The frequency of this ripple is preferably in the resonant frequency range of the transducer undergoing polarization. This polarizing potential may also be a pulsating unidirectional potential of similar frequency.

It is an object of the present invention to provide an improved method for polarizing transducers, which makes possible the production of a transducer comprising a poly-crystalline substance of high dielectric constant and having superior electro-mechanical characteristics, the polarization having been achieved in a shorter period of time or with a lower operating potential than is possible to use with conventional means.

As previously stated, the polarizing field used includes a basic uni-directional potential component, and superimposed thereon is an alternating ripple component having a substantially constant frequency. A circuit by which such a field may be conveniently set up is shown in the attached drawings.

Figure 1:
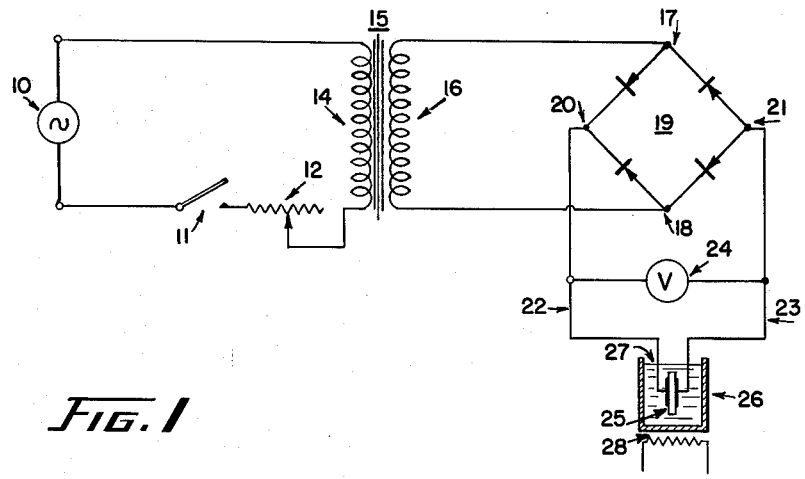
Figure 1 is a circuit diagram illustrating a circuit by which the present invention may be carried out.

According to the present invention, an electrical potential is impressed across the electrode faces of the transducer body by means of the circuit illustrated in Figure 1. Of course, it is to be noted that other similar circuits may be utilized having output characteristics which include a uni-directional voltage upon which there is superimposed an alternating component, and thus the circuit of the present invention to this particular embodiment and there is consequently no intention to limit the scope of the present invention to their particular embodiment alone. The polarizing circuit having a ceramic transducer element 25 connected in polarizing relationship thereto, comprises an input signal generator 10 and is controlled by the main switch 11. The signal generator 10 is preferably one which may operate between relatively wide frequency limits, to accommodate transducer bodies of various types and characteristics, so as to obtain frequencies within the resonant range of various transducer bodies. A rheostat 12 controls the intensity of the potential which is applied to the primary 14 of the step up transformer 15. The secondary 16 of the transformer 15 is connected to the input terminals 17 and 18 of a full wave rectifier bridge generally designated 19, the output terminals 20 and 21 of the bridge 19 being directly coupled to the polarizing leads 22 and 23. A volt meter 24 is connected across the polarizing leads 22 and 23 for indicating the potential thereacross, thereby enabling the operator to conveniently determine the polarizing potential of the arrangement. The ceramic transducer element 25, as previously mentioned, is electrically connected across the leads 22 and 23 of the circuit. The transducer body is held within a container 26 which is filled with a fluid medium 27, for example oil, which may be heated by heating means such as heating element 28 to a temperature in excess of the Curie point of the transducer bodies being polarized.

Figure 2:
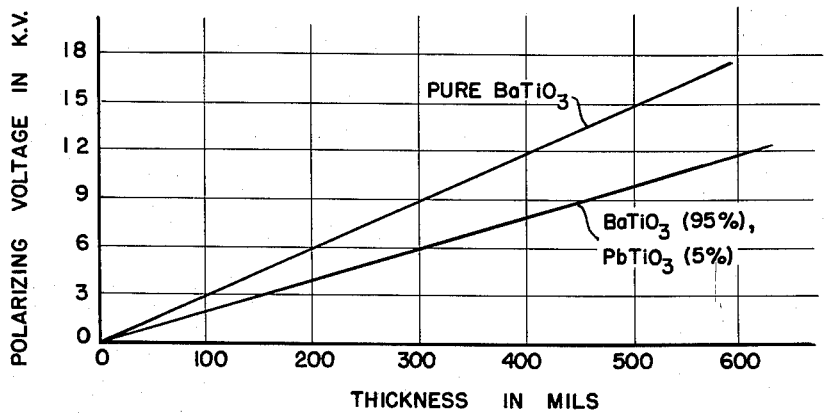
Figure 2 is a graph illustrating the relationship of the polarizing potentials applied for various titanate mixtures with respect to the thickness of the titanate body employed.

The graph shown in Figure 2 defines the polarizing potentials desirable for various types of ceramic elements of given thickness. These relationships between polarizing potential and thickness of the element as shown in Figure 2 merely illustrate that which has been found to be the most satisfactory, and it is understood that substantial variations may be made from these values and satisfactory results obtained.

Throughout the specification, the term "Curie point" will be understood to refer to the temperature at which the crystalline ceramic material transforms from one crystalline type or structure into another; for example the point at which barium titanate ceramic crystals transform their structure from predominantly cubic to predominantly tetragonal. For pure barium titanate, this temperature is approximately 120° C., for lead titanate-barium titanate mixtures, this temperature is higher, while for calcium titanate-barium titanate mixtures (and most other metal titanate-barium titanate mixtures) the Curie point is below 120° C. The temperature at which this phenomenon occurs will, of course, vary with the types of material used as well as the quantity of that material which is used.

I have found that the frequency of the superimposed ripple is of considerable interest in polarizing these ceramic elements. If the frequency of this ripple or pulsating voltage is held in the resonant frequency range of the ceramic to be polarized, the degree and extent of polarization is substantially increased, as exhibited by the superior electro-mechanical behavior of the elements. This resonant range may be determined in accordance with the following equations:

$$F_{(r)} = \frac{C_{(f)}}{t}$$

wherein $F_{(r)}$ is the resonant frequency
$C_{(f)}$ is the frequency constant
$t$ is the thickness of the element $C_{(f)}$ may be determined for any given material as follows:

$$C_{(f)} = \frac{E^{1/2}}{4p}$$

wherein

E is the elastic modulus of the material
p is the density of the material

For barium titanate, the value of frequency constant $C_{(f)}$ is substantially 2500 kc.-mm./sec. This resonant frequency is that frequency at which the transducer exhibits its maximum amplitude of mechanical vibration under a given electrical excitation field.

According to the preferred modification of the present invention, the transducer body is preferably prepared from pure, finely divided raw barium titanate, or from barium titanate mixed with about 5% of other titanates such as lead titanate, or calcium titanate. A deflocculant is added to the titanate mixture, the deflocculant being preferably one which will easily burn off upon subsequent firing, and these materials are then thoroughly mixed together and any agglomerates present are broken down. This mixing operation may be conveniently accomplished in a ball mill. It is very important that this be done in a manner which will not introduce bubbles of air or other gases into the titanate-deflocculant mixture, since gases may become entrained, and if so, will be detrimental to the final product. The raw ceramic-deflocculant mixture is then placed in a porous mold which corresponds substantially to the configuration of the desired final product, and allowed to dry. Plaster of Paris has been found suitable as a material for mold forms. After air drying to constant weight in porous molds, the material is oven fired at a temperature of substantially between 2100° F. and 2500° F. for a period of from 2 to 5 hours, during which time growth of titanate crystals is encouraged. The fired ceramic is then cooled to room temperature over an extended period of time, for example, 36 hours; care being taken to avoid fracturing the ceramic due to thermal stresses which are set up during the cooling cycle.

The fired ceramic is then cut or machined, if necessary, to the desired size and shape of finished product, electrodes applied to the faces of the ceramic body and, if desired, these electrodes are covered with a protective shielding or coating. This finished ceramic body is then ready to be polarized.

It is believed that polarization exerts a force tending to orient the dipoles of the polycrystalline substance undergoing polarization. Polarization is accomplished by means of my novel technique wherein the finished ceramic body is first heated to a temperature exceeding its Curie point in the heating container 26; the heater 28 is then cut off and the heating medium and element are then allowed to cool through the Curie point of the transducer 25, the polarizing potential as herein described being applied during this time and continuing until the element 25 is substantially below its transition temperature. In order that the temperature of the body be more closely and conveniently controlled, I prefer to use a heater utilizing an oil bath fluid medium. The intensity of the potential utilized is in accordance with the graph of Figure 2, for example, 30 volts per mil for pure barium titanate or 20 volts per mil for a barium titanate-lead titanate mixture utilizing 5% lead titanate. (The thickness is determined as the distance between the electrodes of the ceramic body.) As stated previously, the frequency of the alternating ripple or pulsating unidirectional potential is of considerable interest in achieving superior, permanently polarized transducer elements and is preferably in the resonant range of the transducer. This oscillating or pulsating component in the polarizing field assists in orienting the crystals in a shorter period of time than can be accomplished by conventional means, and the polarizing achieved in this manner is more complete than that accomplished by known methods as exhibited by the superior electro-mechanical behavior of the ceramic transducers polarized in accordance with my technique. It is believed that the action exhibited by this polarizing potential on the dipoles of an unpolarized ceramic is analogous to that obtained through agitating a plurality of randomly situated solid objects held in a closed container, and thus situating them into a more compact volume.

Certain preferred embodiments and features of the present invention have been described herein, however, it will be understood that various other modifications may be utilized without departing from the spirit and scope of this invention as defined in the appended claims.

I claim as my invention:

1. The method of producing a permanent piezo-electric effect in a polycrystalline body consisting essentially of barium titanate which comprises subjecting said body to a unidirectional polarizing potential having an alternating ripple component superimposed thereon while said body is substantially at its Curie temperature, the frequency of said ripple component being in the range of the resonant frequency of said body.

2. The method of producing a permanent piezo-electric effect in a polycrystalline ceramic body consisting essentially of barium titanate and having a plurality of spaced electrodes thereon which comprises applying a differential polarizing potential to said spaced electrodes while said ceramic is being cooled through its Curie temperature, said polarizing potential comprising a unidirectional potential component with an alternating ripple component superimposed thereon, said alternating component having a frequency in the range of the resonant frequency of said ceramic body.

3. The method of producing a permanent piezo-electric effect in a polycrystalline ceramic body consisting essentially of barium titanate and having a resonant frequency range, said method comprising subjecting said ceramic to a unidirectional pulsating polarizing potential while said ceramic is being cooled through its Curie point, said pulsating potential having a frequency which substantially matches the resonant frequency range of said ceramic body.

References Cited in the file of this patent

UNITED STATES PATENTS

| | | |
|---|---|---|
| 2,420,652 | Chilowsky | May 20, 1947 |
| 2,420,864 | Chilowsky | May 20, 1947 |
| 2,467,169 | Wainer | Apr. 12, 1949 |
| 2,486,560 | Gray | Nov. 1, 1949 |
| 2,592,703 | Jaffe | Apr. 15, 1952 |
| 2,702,427 | Roberts | Feb. 22, 1955 |
| 2,712,684 | Logan | July 12, 1955 |